Patented Dec. 21, 1948

2,456,723

UNITED STATES PATENT OFFICE 2,456,723

SELECTIVE COPPER SOLVENT FOR DIOLIFIN EXTRACTION

Leland K. Beach, Mountainside, N. J., assignor to Standard Oil Development Company, a corporation of Delaware No Drawing. Application May 13, 1946, Serial No. 669,453

8 Claims. (Cl. 260—681.5)

This invention relates to improvements in the separation of diolefins from mixtures of saturated and unsaturated hydrocarbons and relates particularly to improvements in the separation of diolefins from hydrocarbons having two or more carbon atoms to the molecule by the use of copper solvents.

The affinity of certain cuprous compounds for unsaturated hydrocarbons is well known. Thermally decomposable complexes are formed between the simple olefins and diolefins and cuprous compounds such as cuprous chloride, $CuCl.NH_4Cl$ complexes, etc. However, most of these cuprous compounds and complexes possess certain features such as instability and corrosiveness to metal equipment which render them unsuited for use in the commercial recovery and separation of olefins and diolefins in hydrocarbon fractions.

The use of hydroxy amine complexes of copper, using cuprous chloride or formate, for the separation of olefins from mixtures of hydrocarbons is suggested in U. S. Patent 2,005,500 issued June 18, 1935, to Walter Philip Joshua and Herbert Muggleton Stanley. However, the hydroxy amine copper solutions are unstable on heating to temperatures of the order of 80° C., which are required for satisfactory desorption of the hydrocarbons from the solutions.

In U. S. application Serial No. 371,998 filed December 27, 1940 and now Patent No. 2,370,809, for C. E. Morrell and M. W. Swaney is disclosed the efficacy of the ammoniacal cuprous acetate solutions of high cuprous content for the extraction and separation of butadiene from cracked hydrocarbon fractions. These solutions possess high solvency for butadiene, high selectivity for butadiene over the butylenes, and high thermal stability in glass or in steel equipment. However, these ammoniacal cuprous acetate solutions possess considerably lower solvency for the higher diolefins such as isoprene, piperylene, etc.

In U. S. application Serial No. 638,518 filed December 29, 1945, for C. E. Morrell and M. W. Swaney, the ammonia in the ammoniacal cuprous acetate complexes is replaced by monomethylamine, in part or wholly. The effectiveness of the resulting complex is improved for the extraction and concentration of the higher diolefins such as isoprene from hydrocarbon mixtures. In addition, the basic monomethylamine cuprous acetate solutions retain remarkable thermal stability and are non-corrosive to metal equipment, for example, steel. However the capacity of these basic monomethylamine cuprous acetate solutions is limited.

According to the present invention, it was found that by adjusting the ratio of amine to acetate to water of a cuprous solution, the absorption capacity of the monomethylamine cuprous acetate solution can be greatly increased as illustrated by the following table.

|  | According to U. S. Application Ser. No. 638,518 | | According to Applicants | |
| --- | --- | --- | --- | --- |
|  | Wt., per cent | M/L | Wt., per cent | M/L |
| Monomethylamine | 48 | 16 | 41 | 14 |
| Acetate | 18 | 3 | 34 | 6 |
| Water | 26 | 15 | 12 | 7 |
| Copper— |  |  |  |  |
| ous | 6 | 1.0 | 12 | 2 |
| ic | 2 | 0.24 | 1 | 0.1 |
| Purity of isoprene absorbed at 0° C. by solution in equilibrium with isoprene of 25% purity in pentene-1 |  | 63 |  | 51 |
| Volume of gaseous isoprene of above purity absorbed per volume of copper solution |  | 4.5 |  | 17.7 |

It is not possible by changing the concentration of any one of the components of the solution disclosed in the U. S. application Serial No. 638,518 to arrive at a solution within the optimum range. For example, by cutting down on the amine content at the expense of the other components, both the selectivity and capacity would be found to drop considerably; by raising the acetate content, the same phenomenon would occur; by cutting down on the water, a slight increase in capacity and a slight decrease in selectivity would result but this would be due primarily to an increase in the solubility of copper. The cuprous content of the above solutions is a maximum in each case and cannot be increased independently.

It is only by completely changing the U. S. application Serial No. 638,518 solution composition that a solution of optimum composition is found which has three to four hundred percent greater capacity.

The following table shows that the selectivity and capacity of these optimum solutions may be modified within limits by small changes in solution composition.

*Isoprene absorption capacity and selectivity and other properties of monomethylamine cuprous acetate solutions at 0° C.*

| Composition | | Total Copper Molarity | Absorption-Desorption Data | | |
|---|---|---|---|---|---|
| Amine/Acetate Mole Ratio | Water Molarity | | Selectivity, Purity in Extract/Raffinate | Capacity, $V_2$ soprene/$V_2$ Solution | Efficiency, Moles Isoprene/Moles $Cu_2^{++}$ |
| 2.5 | 9.7 | 2.9 | 84.0/41.8 | 13.2 | 0.42 |
| 2.5 | 10 | 1.45 | 61.4/9.8 | 2.0 | 0.12 |
| 2.5 | | | 57.8/9.9 | 1.9 | 0.12 |
| 3.0 | 0 | 1.9 | 34.7/8.8 | 2.5 | 0.12 |
| 3.0 | | | 57.8/24.9 | 14.6 | 0.69 |
| 3.0 | | | [1] 29.1/14.6 | 9.9 | 0.47 |
| 3.0 | | | 37.4/10.1 | 6.0 | 0.28 |
| 3.0 | 2.5 | 2.3 | | | |
| 3.0 | 3.0 | 1.8 | 41.8/7.6 | 2.7 | 0.14 |
| 3.0 | 4.7 | 2.3 | 59/13 | 4.2 | 0.16 |
| 3.0 | 5.0 | 1.94 | 79.8/35.4 | 11.0 | 0.51 |
| 3.0 | | | [1] 39.2/17.3 | 6.0 | 0.28 |
| 3.0 | | | [1] 63.5/41.3 | 12.0 | 0.55 |
| 3.0 | | | [1] 88.1/77.6 | 22.0 | 1.00 |
| 3.0 | 12.3 | 1.64 | 56/17 | 2.6 | 0.18 |
| 3.0 | 17.8 | 1.18 | 44/19 | 1.9 | 0.18 |

[1] In presence of pentene-1. Trimethylethylene used in other experiments.

In general, the amine to acetate mol ratio that may be used varies from 1.5 to 7; 2.0 to 3.5 being preferred. The water content that may be used varies from 1 to 20 mols per liter; 1.5 to 10 mols per liter being preferred. The cuprous content is between about 1.0 to 2.5 mols per liter, preferably above 1.5 mols per liter. The presence of some cupric copper is desirable to the solution stability and a pH above about 10 is also desirable in order to reduce corrosion to steel. The preferred range of compositions are expressed in the accompanying table in terms of w't % and normalities.

| | Weight, per cent | M/L |
|---|---|---|
| Monomethylamine | 37–45 | 12 –16 |
| Acetate | 25–40 | 4 –7 |
| Water | 1–25 | 1 –15 |
| Copper— | | |
| ous | 10–13 | 1.7– 2.3 |
| ic | 0–2 | 0 – 0.4 |

A comparison of methylamine cuprous solution capacity for diolefins with that of ammoniacal cuprous solutions is shown in the following tables.

| Solution | Extraction at 0° C—Gaseous Butadiene in Butene-1 | | |
|---|---|---|---|
| | Per cent Butadiene in— | | Volume Gaseous $C_4$ Desorbed per volume of Copper Solution |
| | Unabsorbed Gas | Absorbed Gas | |
| Ammoniacal Cuprous Acetate (3.1 M/L Cu.+5 N Ac. 11 N NH₃) | 35 | 90 | 13.9 |
| Do | 100 | 100 | 19.6 |
| Monomethylamine [1] Cuprous Acetate | 35 | 71 | 28.1 |
| Do | 100 | 100 | 39.0 |

| Solution | Extraction at 0° C.—Liquid Isoprene in Trimethylethylene | | |
|---|---|---|---|
| | Per cent Isoprene in— | | Volume Gaseous $C_4$ Desorbed per volume of Copper Solution |
| | Unabsorbed Liquid | Absorbed Liquid | |
| Ammoniacal Cuprous Acetate | 35 | 83 | 1.6 |
| Monomethylamine [1] Cuprous Acetate | 35 | 83 | 13.9 |

[1] 2.0/1, amine/acetate mol ratio, 5 M/L Water, 1.8 M/L total copper.

The amines; dimethyl, trimethyl, ethyl, butyl, amyl and benzylamine, pyridine, pyrrole, toluidine, aniline, quinoline, piperidine, urea, acetonitrile, were tried as well as the anions, sulfate, formate, propionate, tartrate, lactate and chloride, but from the standpoint of corrosion, chemical and thermal stability, vapor pressure, cost, capacity, selectivity, freezing point etc., the monomethylamine cuprous acetate solutions were found to be most efficient.

A solution containing a monomethylamine/acetate mole ratio of 2.0/1.0, 5 M/L water and 1.8 M/L copper, was heated 17 days at 60° C. in presence of polished steel strips. No corrosion, plating or precipitation occurred. A similar solution containing 2.5/1.0 amine to acetate ratio, 5.0 M/L water and 2.1 M/L copper caused no corrosion or plating out at 100° C. after two days.

This solution may be used to separate the isomers of piperylene, that is, cis-piperylene from trans-piperylene and also in the separation and concentration of hexadiene.

What is claimed is:

1. Improvement in separating an unsaturated hydrocarbon from a mixture containing a relatively more saturated hydrocarbon which comprises absorbing the said unsaturated hydrocarbon in a solution of an alkyl amine cuprous acetate complex containing from 1.5 to 10 mols of water per liter and in which the alkyl amine has from 1-4 carbon atoms and the mol ratio of alkyl amine to anion varies from 2.0 to 3.5.

2. Improvement in separating an unsaturated hydrocarbon from a mixture containing also a relatively more saturated hydrocarbon which comprises absorbing the said unsaturated hydrocarbon in a solution of a primary alkyl amine cuprous acetate complex containing from 1.5 to 10 mols of water and in which the alkyl amine has from 1-4 carbon atoms and the mol ratio of alkyl amine to total anion varies from 2.0 to 3.5.

3. Improvement in separating a diolefin from a mixture containing a relatively more saturated hydrocarbon which comprises absorbing the diolefin in an aqueous solution of a methylamine cuprous acetate complex containing from 1.5 to 10 mols of water per liter and in which the amine to total anion mol ratio varies from 2.0 to 3.5 and separating said solution and desorbing the diolefin.

4. Improvement in separating isoprene from a mixture with a more saturated hydrocarbon which comprises absorbing the isoprene in an aqueous solution of a monomethylamine cuprous acetate complex containing from 1.5 to 10 mols of water per liter and in which the amine to total anion mol ratio varies from 2.0 to 3.5, separating the cuprous acetate solution and desorbing the isoprene.

5. Improvement in separating isoprene from a mixture with pentenes which comprises absorbing the isoprene in an aqueous solution of a mono-methylamine cuprous acetate complex containing from 1.5 to 10 mols of water per liter and in which the amine to total acetate mol ratio varies from 2.0 to 3.5, separating the cuprous solution and desorbing the isoprene.

6. Improvement in separating piperylene from a mixture with a more saturated hydrocarbon which comprises absorbing the piperylene in an aqueous solution of a mono-methylamine cuprous acetate complex containing from 1.5 to 10 mols of water per liter and in which the amine to total anion mol ratio varies from 2.0 to 3.5, separating the cuprous acetate solution and desorbing pentadiene.

7. Improvement in separting methyl pentadienes from a mixture with a more saturated hydrocarbon which comprises absorbing the methyl pentadienes in an aqueous solution of a mono-methylamine cuprous acetate complex containing from 1.5 to 10 mols of water per liter and in which the amine to total anion mol ratio varies from 2.0 to 3.5, separating the cuprous acetate solution and desorbing the methyl pentadienes.

8. Improvement in separating a diolefin from a mixture containing also a relatively more saturated hydrocarbon which comprises absorbing the said unsaturated hydrocarbon in a solution of an alkyl amine cuprous acetate complex containing from 1.5 to 10 mols of water per liter in which the amine to total anion mol ratio varies from 2.0 to 3.5 and the alkyl amine has from 1 to 4 carbon atoms inclusive.

LELAND K. BEACH.

REFERENCES CITED

The following references are of record in the file of this patent:

UNITED STATES PATENTS

| Number | Name | Date |
|---|---|---|
| 2,245,719 | Robey | June 17, 1941 |
| 2,369,559 | Gilliland | Feb. 13, 1945 |
| 2,376,239 | Evans et al. | May 15, 1945 |
| 2,381,311 | Robey et al. | Aug. 7, 1945 |
| 2,384,329 | Morrell et al. | Sept. 4, 1945 |
| 2,401,896 | Asbury et al. | June 11, 1946 |